US009460009B1

(12) United States Patent
Taylor et al.

(10) Patent No.: US 9,460,009 B1
(45) Date of Patent: Oct. 4, 2016

(54) LOGICAL UNIT CREATION IN DATA STORAGE SYSTEM

(75) Inventors: Jason L. Taylor, Apex, NC (US); Alan L. Taylor, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 184 days.

(21) Appl. No.: 13/429,883

(22) Filed: Mar. 26, 2012

(51) Int. Cl.
*G06F 12/06* (2006.01)
*G06F 3/06* (2006.01)

(52) U.S. Cl.
CPC .......... *G06F 12/0646* (2013.01); *G06F 3/0608* (2013.01); *G06F 3/0641* (2013.01); *G06F 3/0665* (2013.01)

(58) Field of Classification Search
CPC ........... G06F 17/30088; G06F 3/0641; G06F 12/0646
USPC ........................................ 711/114, 117, 153
See application file for complete search history.

(56) References Cited

U.S. PATENT DOCUMENTS

| 5,835,953 | A * | 11/1998 | Ohran ........................... 711/162 |
| 7,032,089 | B1 * | 4/2006 | Ranade ............... G06F 11/2069 707/999.202 |
| 7,693,880 | B1 * | 4/2010 | Ranade ............. G06F 17/30212 707/999.203 |
| 2003/0005248 | A1 * | 1/2003 | Selkirk et al. ................ 711/165 |
| 2004/0117567 | A1 * | 6/2004 | Lee et al. ....................... 711/154 |
| 2006/0047926 | A1 * | 3/2006 | Zheng ........................... 711/162 |
| 2007/0226444 | A1 * | 9/2007 | Yagawa ........................ 711/170 |
| 2007/0260842 | A1 * | 11/2007 | Faibish et al. ................ 711/170 |
| 2008/0270694 | A1 * | 10/2008 | Patterson et al. ............. 711/114 |
| 2008/0270719 | A1 * | 10/2008 | Cochran et al. .............. 711/162 |
| 2010/0077168 | A1 * | 3/2010 | Arakawa ....................... 711/165 |
| 2010/0082901 | A1 * | 4/2010 | Komikado et al. ........... 711/114 |
| 2011/0307658 | A1 * | 12/2011 | Miwa et al. ................... 711/114 |
| 2012/0166736 | A1 * | 6/2012 | Yamamoto et al. .......... 711/147 |
| 2012/0173813 | A1 * | 7/2012 | Mizuta et al. ................ 711/114 |
| 2012/0278580 | A1 * | 11/2012 | Malige et al. ................ 711/166 |
| 2012/0290537 | A1 * | 11/2012 | Smith et al. .................. 707/654 |
| 2012/0303590 | A1 * | 11/2012 | Chernow ...................... 707/675 |

OTHER PUBLICATIONS

Sakis Kasampalis, Copy on Write Based File Systems Performance Analysis and Implementation, Kogens Lyngby 2010, p. 19-20.*
P. Mell et al., "The NIST Definition of Cloud Computing," U.S. Department of Commerce, Computer Security Division, National Institute of Standards and Technology, Special Publication 800-145, Sep. 2011, 7 pages.
F. Knight et al., "T10/11-489 r2," Proposal—Third Party Copy Commands for SBC-3, Jan. 2012, pp. 1-25.

* cited by examiner

*Primary Examiner* — Midys Rojas
*Assistant Examiner* — Leandro Villanueva
(74) *Attorney, Agent, or Firm* — Ryan, Mason & Lewis, LLP

(57) ABSTRACT

Techniques for creating logical units associated with a data storage system. In one example, a method comprises the following steps. One or more blocks of source data associated with a data storage system are identified. The one or more blocks of source data are associated with at least a first logical unit that exists in the data storage system. A second logical unit is created which references the one or more identified blocks of source data.

20 Claims, 5 Drawing Sheets

LOGICAL UNIT CREATION IN DATA STORAGE SYSTEM

FIELD

The field relates to data storage systems, and more particularly to techniques for creating logical units associated with such data storage systems.

BACKGROUND

A basic functional element of storage for a data storage system is typically referred to as a "logical unit" (LU). Accordingly, a "logical unit number" (LUN) is a unique identifier used to designate a logical unit. Each LU may be part of a hard disk drive, an entire hard disk drive or multiple hard disk drives in a data storage system. One or more LUs may be part of a storage array that is accessible over a storage area network (SAN). Thus, by way of example only, a LUN could identify an entire redundant array of independent disks (RAID) set, a single disk or partition, or multiple hard disks or partitions. In any case, an LU is typically treated as if it is a single device and is identified by the LUN.

It is known that data storage systems can be implemented in a distributed virtual infrastructure. In such an environment, LUs are added and removed as storage demand changes. In a case when a new LU is created, by way of example only, data from an existing LU may be copied from physical memory locations identified by the existing LU and stored in other physical memory locations identified by the newly-created LU. Such an operation typically involves both data processing (e.g., central processing unit (CPU) and memory costs) and transfer bandwidth costs, as well as the utilization of additional disk space.

SUMMARY

Embodiments of the present invention provide improved techniques for creating logical units associated with a data storage system.

In one embodiment, a method comprises the following steps. One or more blocks of source data associated with a data storage system are identified. The one or more blocks of source data are associated with at least a first logical unit that exists in the data storage system. A second logical unit is created which references the one or more identified blocks of source data.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

In a further embodiment, a data storage system comprises logical units and a processor that is configured to perform steps of the above-described method.

Advantageously, illustrative embodiments of the invention create a new logical unit from one or more existing logical units without copying data associated with the one or more existing logical units. Creation of such an amalgamated logical unit reduces data processing and transfer bandwidth costs, and preserves valuable disk space.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1A:
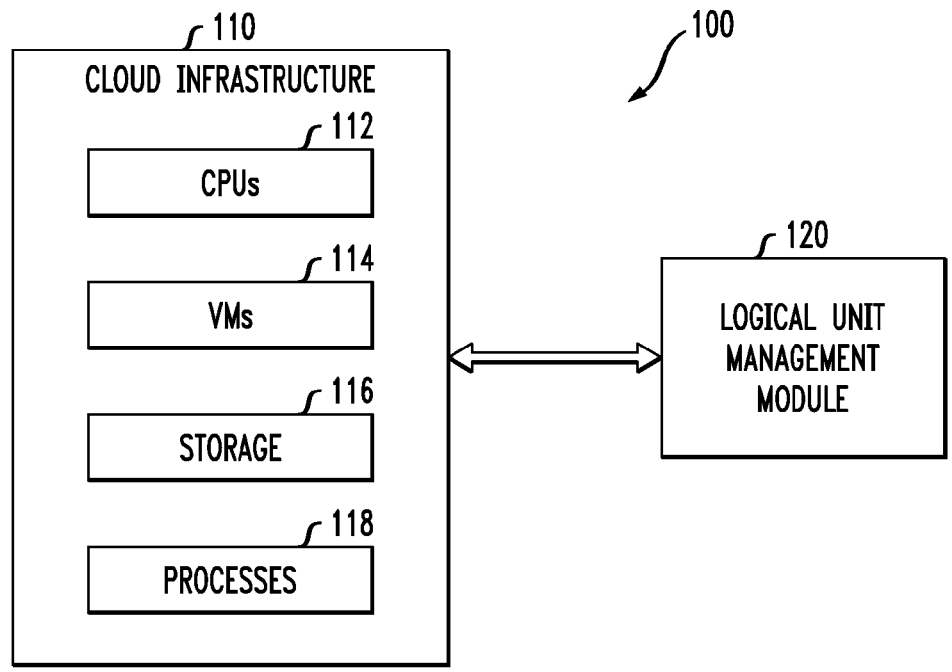
FIG. 1A shows cloud infrastructure and a logical unit management module, in accordance with one embodiment of the invention.

FIG. 1A shows a system 100 configured in accordance with an illustrative embodiment of the present invention. The system 100 comprises cloud infrastructure 110 and a logical unit management module 120. As will be explained in detail below, logical unit management module 120 manages logical units in the cloud infrastructure 110. Cloud infrastructure 110 is illustratively depicted in the figure as comprising an execution environment with execution components comprising one or more central processing units (CPUs) 112, one or more virtual machines (VMs) 114, and one or more storage devices 116. The execution components are configured to execute one or more processes 118 that operate on one or more process input data sets that generate one or more process output data sets. The cloud infrastructure 110 and the logical unit management module 120 may be considered an example of a data storage system.

The logical unit management module 120 manages the addition, removal and altering of logical units in the cloud infrastructure 110. As mentioned above, a logical unit is a basic functional element of storage for a data storage system. A logical unit number is a unique identifier used to designate a logical unit. Further, each logical unit may be part of a hard disk drive, an entire hard disk drive or multiple hard disk drives (e.g., storage devices 116) in a data storage system. Still further, one or more logical units may be part of a storage array that is accessible over a storage area network (SAN). Thus, by way of example only, a logical unit number could identify an entire redundant array of independent disks (RAID) set, a single disk or partition, or multiple hard disks or partitions. In any case, a logical unit is typically treated as if it is a single device and is identified by its logical unit number.

Advantageously, in one embodiment, the logical unit management module 120 is configured to identify one or more blocks of source data (also called source extents) associated with at least a first logical unit that exists in the data storage system. The module then creates a second logical unit which references the one or more identified blocks of source data. As will be illustrated, in one embodiment, the second logical unit contains pointers to the one or more blocks of source data associated with the first logical unit. The second (new) logical unit may be referred to as an amalgamated logical unit since it is created from one or more other logical units.

For example, the logical unit management module 120 creates a new logical unit from data that already is associated with one or more existing logical units. The source extents of the new logical unit are specified at create time. Rather than allocating new physical memory space and copying the source data from physical memory locations associated with the one or more existing logical units to new physical memory space allocated for the new logical unit, the new logical unit simply references the original source data already associated with one or more existing logical units. The logical unit management module 120 is also configured to create a new logical unit that has one or more parts that are built on data from other logical units and one or more other parts initialized with zeroes. By leveraging the concept of referencing existing data rather than allocating new space and copying the existing data to the new space, this approach uses less CPU and bus bandwidth to create the new logical unit. The approach also reduces needed disk space as the data is only copied, for example, when new data is written to one of the existing logical units whose data is being shared by the new logical unit (i.e., write-split scenario).

Although the system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the logical unit management module 120 may be implemented on a second processing device of a second processing platform. It is also to be understood that a given embodiment of the system 100 may include multiple instances of the elements 110 and 120, although only single instances of such elements are shown in the system diagram for clarity and simplicity of illustration.

Figure 1B:
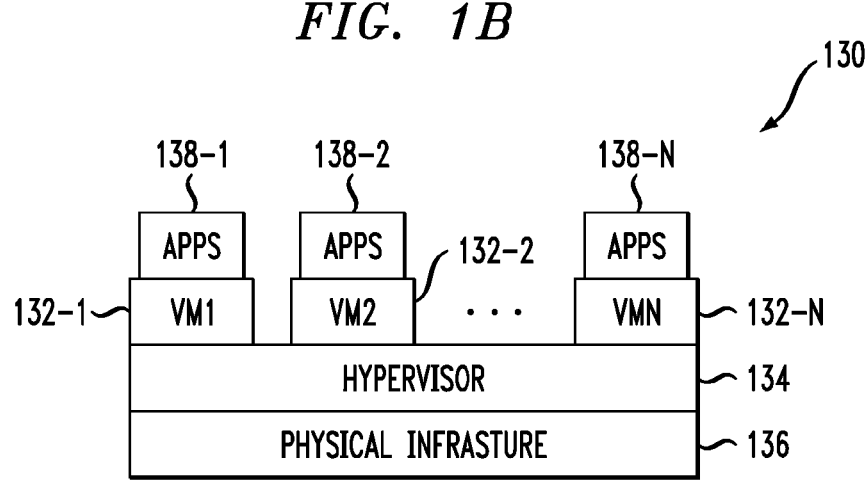
FIG. 1B shows a more detailed view of the cloud infrastructure of FIG. 1A.

As shown in FIG. 1B, a cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPU(s) 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor 134 (or VM monitor software) which, as shown in FIG. 1B, is directly inserted on top of the computer hardware in order to allocate hardware resources of the physical computer dynamically and transparently. The hypervisor 134 affords the ability for multiple operating systems to run concurrently on a single physical computer and share hardware resources with each other.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
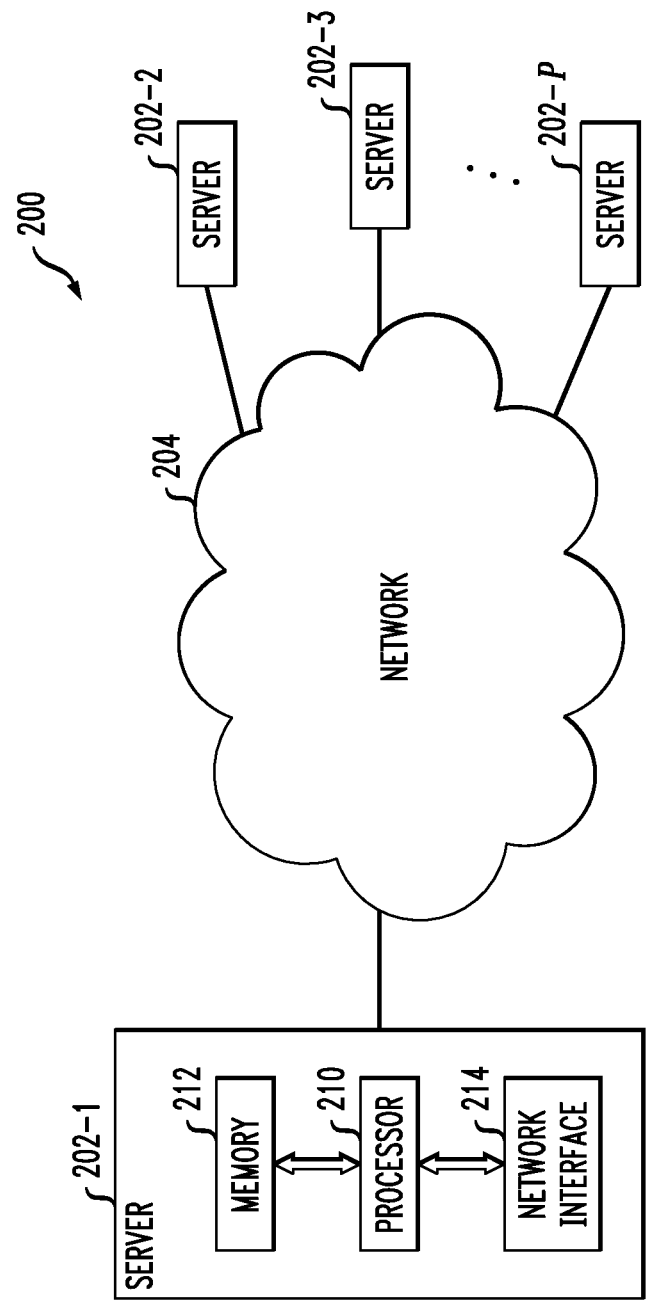
FIG. 2 shows a processing platform on which the cloud infrastructure and the logical unit management module of FIG. 1A are implemented, in accordance with one embodiment of the invention.

An example of a processing platform on which the cloud infrastructure 110 and/or the logical unit management module 120 of FIG. 1A may be implemented is processing platform 200 shown in FIG. 2. In one embodiment, the processing platform 200 is a data storage system. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

Illustrative details of the logical unit management module 120, and how an amalgamated logical unit is created and managed, will now be described with reference to FIGS. 3 through 5.

Figure 3:
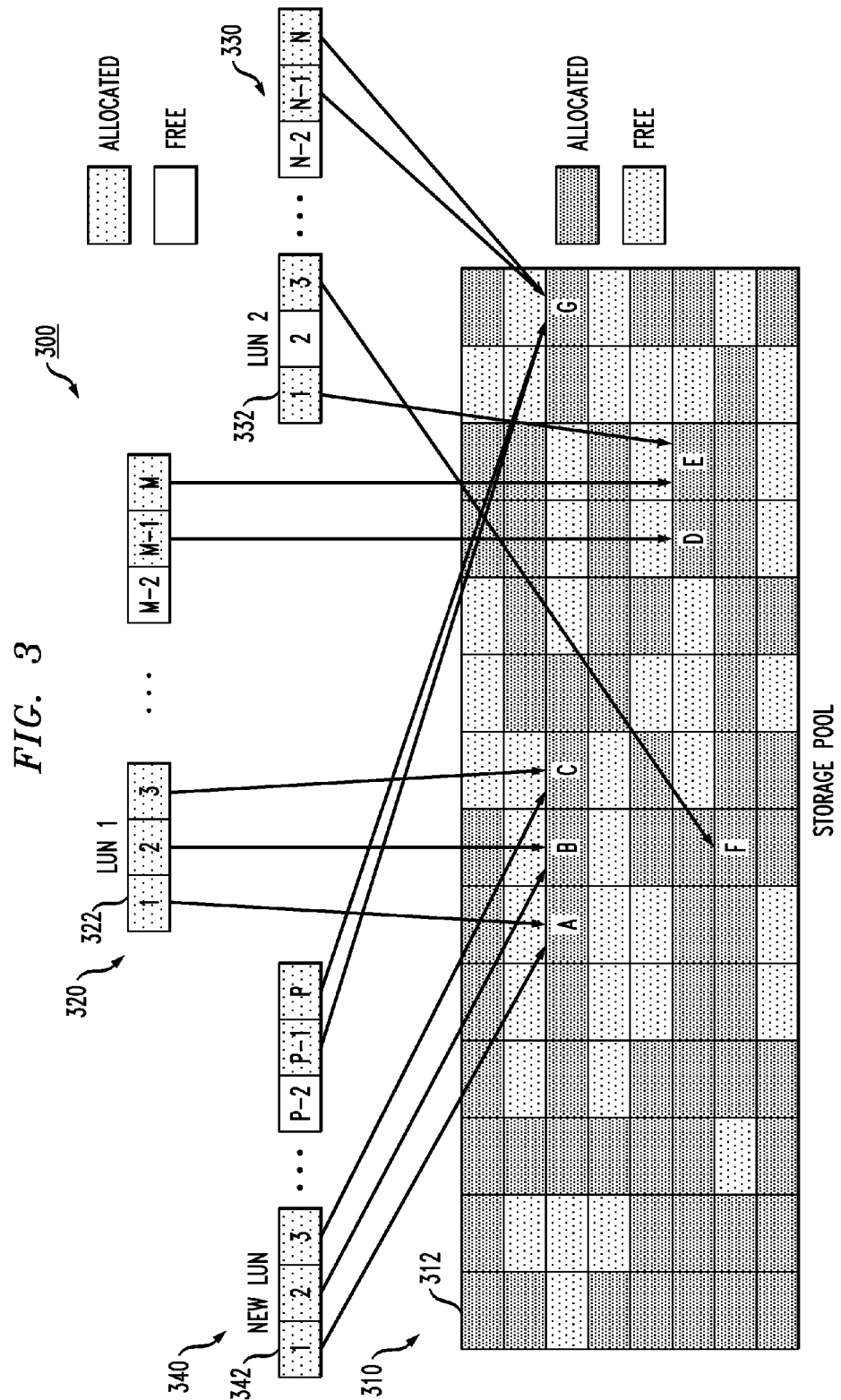
FIG. 3 shows an example of creating an amalgamated logical unit from multiple other logical units in a data storage system, in accordance with one embodiment of the invention.

FIG. 3 shows an example of creating an amalgamated logical unit from multiple other logical units in a data storage system, in accordance with one embodiment of the invention.

In the data storage system 300 depicted in this example, a storage pool 310 comprises a plurality of addressable physical memory blocks 312. Each memory block 312 is designated by shading to indicate whether it is "allocated" (darker shading as compared to free block) and therefore being used to store data, or "free" (lighter shading as compared to allocated block) and therefore not currently being used to store data.

Further, in this example, it is assumed that two logical units 320 and 330, respectively designated as "LUN 1" and "LUN 2," exist in the data storage system 300, and that an amalgamated logical unit 340, designated as "New LUN," is being created from portions of LUN 1 and LUN 2, in accordance with an embodiment of the invention. Each logical unit is assumed to be comprised of a plurality of addressable logical memory blocks, i.e., LUN 1 includes memory blocks 322-1 through 322-M, LUN 2 includes memory blocks 332-1 through 332-N, and New LUN includes memory blocks 342-1 through 342-P. Each LUN memory block is designated by shading to indicate it is "allocated" and therefore pointing to a memory block in the storage pool 310, or no shading to indicate that it is "free" and therefore not currently pointing to a memory block in the storage pool.

It is to be understood that the storage pool 310 may be considered to be comprised of one or more physical storage devices (e.g., storage device(s) 116 shown in FIG. 1A), while the logical units 320, 330 and 340 are logical representations of memory space of the one or more physical storage devices.

As mentioned above in conjunction with FIG. 1A, the logical unit management module 120 creates New LUN from existing logical units LUN 1 and LUN 2. Advantageously, once the module is provided with the source extents of the new logical unit (New LUN), the module can then determine which one or more existing logical units to use to create the new logical unit. In this example, parts of LUN 1 and LUN 2 are used to create New LUN.

Thus, as shown in FIG. 3 with respect to LUN 1, certain memory blocks 322 contain pointers that reference certain memory blocks 312 in storage pool 310, i.e., 322-1 references 312-A, 322-2 references 312-B, 322-3 references 312-C, 322-M-1 references 312-D, and 322-M references 312-E. Note that LUN 1 memory block 322-M-2 is free (is not associated with any data in storage pool 310). Similarly, with respect to LUN 2, certain memory blocks 332 contain pointers that reference certain memory blocks 312 in storage pool 310, i.e., 332-1 references 312-E, 332-3 references 312-F, and 332-N-1 and 332-N both reference 312-G. Note that LUN 2 memory blocks 332-2 and 332-N-2 are free (are not associated with any data in storage pool 310).

Accordingly, New LUN (amalgamated logical unit) is created by the logical unit management module 120 from parts of LUN 1 and LUN 2. That is, as shown in this example, the module 120 uses memory blocks 322-1 through 322-3 of LUN 1 to create memory blocks 342-1 through 342-3 of the New LUN, i.e., pointers to storage pool memory blocks 312-A through 312-C are stored in memory blocks 342-1 through 342-3, respectively. Further, the module 120 uses memory blocks 332-N-1 and 332-N of LUN 2 to create memory blocks 342-P-1 through 342-P of the New LUN, i.e., a pointer to storage pool memory block 312-G is stored in memory blocks 342-P-1 and 342-P. Note that memory block 342-P-2 is free (is not associated with any data in storage pool 310).

Thus, by leveraging this concept of referencing data associated with existing logical units, this approach uses less CPU and bus bandwidth to create the new logical unit since the data is not copied at create time. The approach also reduces needed disk space as the data is only copied, for example, when new data is written to one of the existing logical units whose data is being shared by the new logical unit (i.e., write-split scenario).

Figure 4:
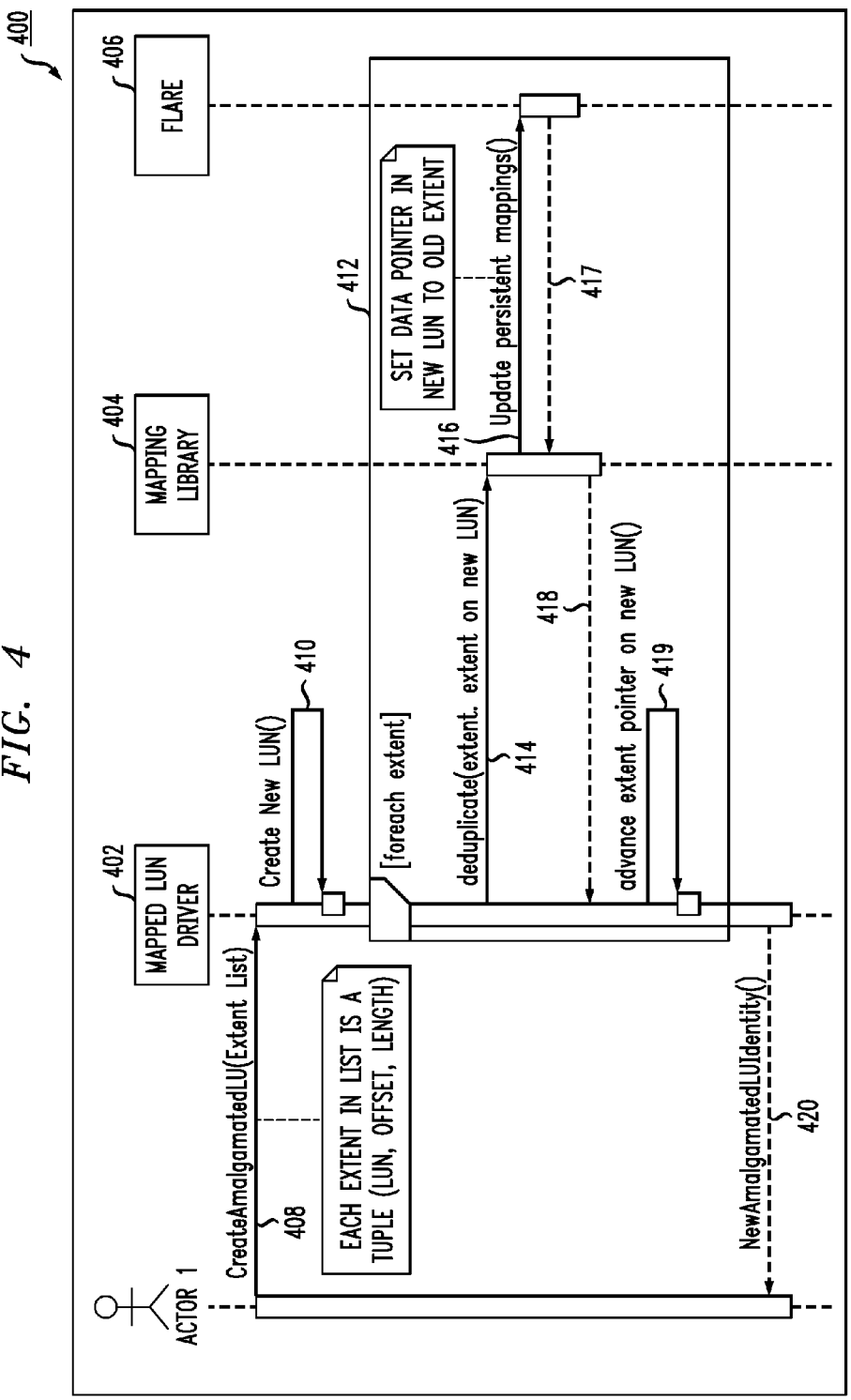
FIG. 4 shows an amalgamated logical unit creation methodology in a data storage system, in accordance with one embodiment of the invention.

FIG. 4 shows an amalgamated logical unit creation methodology in a data storage system 400, in accordance with one embodiment of the invention. As shown, the data storage system 400 comprises a mapped logical unit number driver component 402, a mapping library component 404 and a flare component 406. It is to be understood that these components may be considered to be part of the logical unit management module 120 (FIG. 1A). The mapped logical unit number driver component 402 serves as the driver for creating logical units including amalgamated logical units. The mapping library component 404 maps logical unit address space to storage pool (e.g., 310 in FIG. 3) address space. The flare component 406 provisions the physical memory blocks of the storage pool that are used to store the data (e.g., provisions RAID blocks as needed).

As shown in step 408, a request is obtained to create an amalgamated logical unit. The request may come from an entity such as an individual or a system. The request includes an extent list, i.e., a list identifying the source data that is to be used to create the amalgamated logical unit. In one embodiment, each extent in the list is a tuple of (LUN, Offset, Length), i.e., the tuple identifies the existing logical unit (including its memory location offset and length) to be used to create the new amalgamated logical unit.

In step 410, the new amalgamated logical unit is created. The detailed steps of creation step 410 are shown inside block 412. More specifically, for each extent in the list, a deduplicate request is sent in step 414 from the mapped logical unit number driver component 402 to the mapping library component 404. The deduplicate request includes a tuple of (extent, extent on new LUN), i.e., the tuple identifies the extent to be used from the existing logical unit for the extent of the new logical unit. The mapping library component 404 maps the existing extent to the new extent. In step 416, the mapping library component 404 notifies the flare component 406 to update the persistent mappings for this particular source data. This results in a data pointer being set in the new logical unit which points to the extent (source data in the storage pool) of the existing logical unit. The flare component 406 notifies the mapping library component 404 (step 417) and the mapping library component 404 notifies the driver component 402 (step 418) when the pointer is set for the new logical unit. In step 419, the driver component 402 advances to the next extent in the list (received in step 408) and steps 414 through 418 are repeated. This iterative process executes until all extents in the list are processed. Once the amalgamated logical unit is created, the original requesting entity (individual or system) is notified in step 420.

Figure 5:
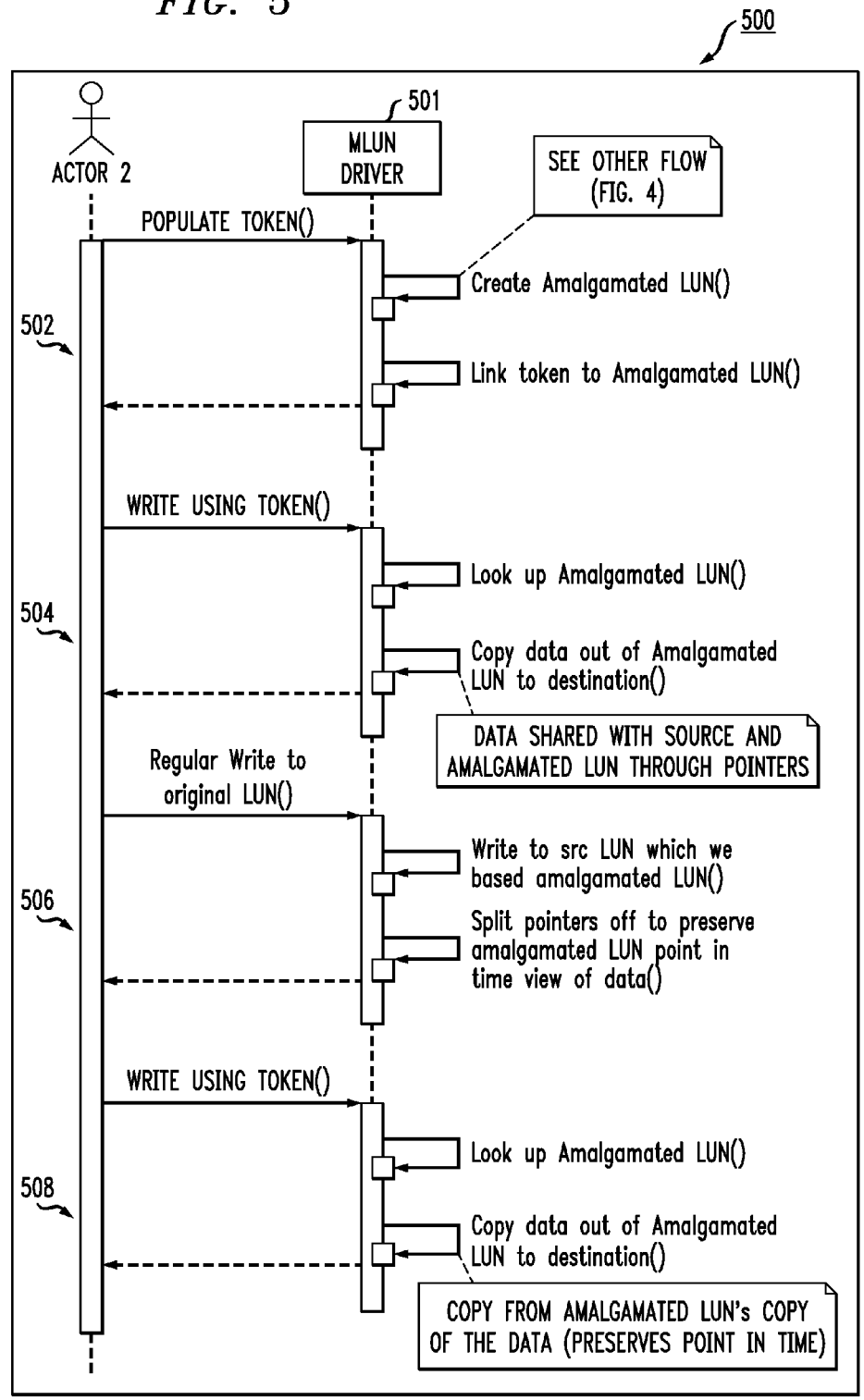
FIG. 5 shows tokenized read/write operations associated with an amalgamated logical unit in a data storage system, in accordance with one embodiment of the invention.

FIG. 5 shows tokenized read/write operations 500 associated with an amalgamated logical unit in a data storage system, in accordance with one embodiment of the invention. Note that MLUN driver 501 corresponds to mapped logical unit driver component 402 in FIG. 4.

As shown in operation 502, a token is populated. A "token" as used herein corresponds to a logical unit. Thus, in one embodiment, populating a token corresponds to creating an amalgamated logical unit as described in FIG. 4. Operation 502 results in a token being linked to the newly created amalgamated logical unit.

Operation 504 (write using token) corresponds to an operation whereby data associated with the newly created amalgamated logical unit (created in operation 502) is copied to a first target logical unit (first destination). This is equivalent to reading the data associated with the amalgamated logical unit and writing it to the first target logical unit. While both the amalgamated logical unit and the one or more existing logical units from which the amalgamated logical unit was created point to the same data (i.e., share the data through pointers) to be copied to the first target logical unit, this poses no pointer/referencing issue since the source data is not being altered but simply copied.

However, now consider write-split operation 506. Operation 506 depicts a regular write operation to one of the existing logical units that was used to create the amalgamated logical unit (in operation 502). By writing to this logical unit, it is assumed that some part of its source data is being altered. However, assume that the amalgamated logical unit that shares this source data requires/desires the source data to remain unaltered. Thus, to handle this situation, operation 506 provides for splitting off the pointers that point to that source data so that the amalgamated logical unit continues to point to the source data in its original form and the existing logical unit now points to the data altered by the write operation. This may also involve allocating new memory space. However, by performing this splitting operation, the data used to form the amalgamated logical unit is preserved in a time view of the data.

Lastly, considering operation 508 (write using token), it is assumed that data associated with the newly created amalgamated logical unit (created in operation 502) is copied to a second target logical unit (second destination), after operation 506 has occurred (i.e., after source data was altered and pointers were split off). This is equivalent to reading the data associated with the amalgamated logical unit and writing it to the second target logical unit. This operation poses no pointer/referencing issue since the amalgamated logical unit still points to the original source data, and not to data altered in operation 506.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising the steps of:
identifying one or more blocks of source data associated with a data storage system, the one or more blocks of source data being associated with at least a portion of a first logical unit and at least a portion of a second logical unit that exist in the data storage system; and
creating a third logical unit which references the one or more identified blocks of source data;
wherein the third logical unit comprises at least one pointer to a first allocated block of source data and at least one pointer to a second allocated block of source data, the first allocated block of source data being associated with the first logical unit but not the second logical unit and the second allocated block of source data being associated with the second logical unit but not the first logical unit; and
wherein creating the third logical unit is responsive to a request from a requesting entity comprising a list of extents, each extent comprising a tuple identifying a logical unit, a memory location offset and a length;
wherein creating the third logical unit comprises:
generating a deduplicate request for one of the extents in the list, the deduplicate request comprising a tuple identifying an existing extent to be used from one of the first logical unit and the second logical unit for creating the third logical unit;

mapping the existing extent identified in the deduplicate request to a new extent for the third logical unit by mapping a logical unit address space to an address space of a storage pool;

updating persistent mappings for source data identified by the existing extent by setting a data pointer in the third logical unit to point to the existing extent so as to provision physical memory blocks of the storage pool that are used to store the source data identified by the existing extent;

repeating the generating, mapping and updating for each extent in the list; and sending a notification to the requesting entity indicating that the third logical unit has been created.

2. The method of claim 1, further comprising the step of preserving references by the third logical unit to the one or more identified blocks of source data in its original form when at least a portion of the one or more identified blocks of source data is altered by a write operation.

3. The method of claim 1, further comprising the step of copying at least a portion of the one or more identified blocks of source data associated with the third logical unit in response to a request to read data from the third logical unit and then write the read data to a destination.

4. The method of claim 1, wherein the data storage system is part of a cloud computing environment.

5. The method of claim 1, wherein the data storage system is part of a distributed virtual infrastructure.

6. A computer program product comprising a non-transitory processor-readable storage medium having encoded therein executable code of one or more software programs, wherein the one or more software programs when executed by the processor of the processing device implement the steps of the method of claim 1.

7. An apparatus comprising:

a memory; and a processor operatively coupled to the memory and configured to: identify one or more blocks of source data associated with a data storage system, the one or more blocks of source data being associated with at least a portion of a first logical unit and at least a portion of a second logical unit that exist in the data storage system; and create a third logical unit which references the one or more identified blocks of source data;

wherein the third logical unit comprises at least one pointer to a first allocated block of source data and at least one pointer to a second allocated block of source data, the first allocated block of source data being associated with the first logical unit but not the second logical unit and the second allocated block of source data being associated with the second logical unit but not the first logical unit; and wherein creating the third logical unit is responsive to a request from a requesting entity comprising a list of extents, each extent comprising a tuple identifying a logical unit, a memory location offset and a length; and wherein creating the third logical unit comprises:

generating a deduplicate request for one of the extents in the list, the deduplicate request comprising a tuple identifying an existing extent to be used from one of the first logical unit and the second logical unit for creating the third logical unit;

mapping the existing extent identified in the deduplicate request to a new extent for the third logical unit by mapping a logical unit address space to an address space of a storage pool;

updating persistent mappings for source data identified by the existing extent by setting a data pointer in the third logical unit to point to the existing extent so as to provision physical memory blocks of the storage pool that are used to store the source data identified by the existing extent;

repeating the generating, mapping and updating for each extent in the list; and sending a notification to the requesting entity indicating that the third logical unit has been created.

8. The apparatus of claim 7, wherein the processor is further configured to preserve references by the third logical unit to the one or more identified blocks of source data in its original form when at least a portion of the one or more identified blocks of source data is altered by a write operation.

9. The apparatus of claim 7, wherein the processor is further configured to copy at least a portion of the one or more identified blocks of source data associated with the third logical unit in response to a request to read data from the third logical unit and then write the read data to a destination.

10. The apparatus of claim 7, wherein the data storage system is part of a cloud computing environment.

11. The apparatus of claim 7, wherein the data storage system is part of a distributed virtual infrastructure.

12. The apparatus of claim 7, wherein the memory and processor are part of a logical unit management module.

13. A data storage system, comprising:

a first logical unit and a second logical unit, the first logical unit and the second logical unit configured to be associated with one or more blocks of source data;

a third logical unit, the third logical unit configured to contain references to the one or more blocks of source data associated with at least a portion of the first logical unit and at least a portion of the second logical unit; and a processor configured to manage the first logical unit, the second logical unit and the third logical unit;

wherein the third logical unit comprises at least one pointer to a first allocated block of source data and at least one pointer to a second allocated block of source data, the first allocated block of source data being associated with the first logical unit but not the second logical unit and the second allocated block of source data being associated with the second logical unit but not the first logical unit; and wherein creating the third logical unit is responsive to a request from a requesting entity comprising a list of extents, each extent comprising a tuple identifying a logical unit, a memory location offset and a length; and wherein creating the third logical unit comprises:

generating a deduplicate request for one of the extents in the list, the deduplicate request comprising a tuple identifying an existing extent to be used from one of the first logical unit and the second logical unit for creating the third logical unit;

mapping the existing extent identified in the deduplicate request to a new extent for the third logical unit by mapping a logical unit address space to an address space of a storage pool;

updating persistent mappings for source data identified by the existing extent by setting a data pointer in the third logical unit to point to the existing extent so as to provision physical memory blocks of the storage pool that are used to store the source data identified by the existing extent;

repeating the generating, mapping and updating for each extent in the list; and sending a notification to the requesting entity indicating that the third logical unit has been created.

14. The data storage system of claim 13, wherein the processor is further configured to preserve references by the third logical unit to the one or more blocks of source data in its original form when at least a portion of the one or more blocks of source data is altered by a write operation.

15. The data storage system of claim 13, wherein the processor is further configured to copy at least a portion of the one or more blocks of source data associated with the third logical unit in response to a request to read data from the third logical unit and then write the read data to a destination.

16. The data storage system of claim 13, wherein the data storage system is part of a cloud computing environment.

17. The data storage system of claim 13, wherein the data storage system is part of a distributed virtual infrastructure.

18. The method of claim 1, wherein the first logical unit and the second logical unit each comprises at least one free block and at least one allocated block of source data.

19. The apparatus of claim 7, wherein the first logical unit and the second logical unit each comprises at least one free block and at least one allocated block of source data.

20. The data storage system of claim 13, wherein the first logical unit and the second logical unit each comprises at least one free block and at least one allocated block of source data.

* * * * *